United States Patent
Boehm et al.

(10) Patent No.: US 10,268,461 B2
(45) Date of Patent: Apr. 23, 2019

(54) GLOBAL DATA FLOW OPTIMIZATION FOR MACHINE LEARNING PROGRAMS

(71) Applicant: International Business Machines Corporation, Armonk, NY (US)

(72) Inventors: Matthias Boehm, San Jose, CA (US); Mathias Peters, Berlin (DE); Berthold Reinwald, San Jose, CA (US); Shirish Tatikonda, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 14/949,740

(22) Filed: Nov. 23, 2015

(65) Prior Publication Data
US 2017/0147943 A1 May 25, 2017

(51) Int. Cl.
*G06F 8/41* (2018.01)
*G06F 9/46* (2006.01)

(52) U.S. Cl.
CPC .............. *G06F 8/433* (2013.01); *G06F 8/453* (2013.01); *G06F 8/457* (2013.01); *G06F 9/46* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 8,612,368 B2* | 12/2013 | Burdick | ................ | G06F 9/4843 706/12 |
| 8,838,648 B2* | 9/2014 | Sismanis | ........... | G06F 17/30306 707/791 |
| 8,924,408 B2* | 12/2014 | Brown | ................ | G06F 17/3089 707/760 |
| 9,027,028 B2* | 5/2015 | An | ......... | G06F 9/5005 718/104 |
| 9,171,077 B2* | 10/2015 | Balmin | ............. | G06F 17/30864 |
| 9,286,044 B2* | 3/2016 | Boehm | ...................... | G06F 8/45 |
| 9,396,164 B2* | 7/2016 | Reinwald | ................ | G06F 17/16 |
| 9,400,767 B2* | 7/2016 | Balmin | ................... | G06F 17/10 |
| 9,454,472 B2* | 9/2016 | Reinwald | ................ | G06F 17/16 |
| 9,483,503 B2* | 11/2016 | Qiu | ........ | G06F 17/303 |
| 9,652,374 B2* | 5/2017 | Reinwald | ................ | G06F 17/16 |

(Continued)

OTHER PUBLICATIONS

Determining the Structure of Decision Directed Acyclic Graphs for Multiclass Classification Problems Thaise M. Quiterio; Ana C. Lorena 2016 5th Brazilian Conference on Intelligent Systems (BRACIS) Year: 2016 pp. 115-120 IEEE Conferences.*

(Continued)

*Primary Examiner* — Michael B Holmes
(74) *Attorney, Agent, or Firm* — Sherman IP LLP; Kenneth L. Sherman; Steven Laut

(57) ABSTRACT

A method for global data flow optimization for machine learning (ML) programs. The method includes receiving, by a storage device, an initial plan for an ML program. A processor builds a nested global data flow graph representation using the initial plan. Operator directed acyclic graphs (DAGs) are connected using crossblock operators according to inter-block data dependencies. The initial plan for the ML program is re-written resulting in an optimized plan for the ML program with respect to its global data flow properties. The re-writing includes re-writes of: configuration dataflow properties, operator selection and structural changes.

20 Claims, 12 Drawing Sheets

(56) References Cited

U.S. PATENT DOCUMENTS

| | | | | |
|---|---|---|---|---|
| 9,684,493 | B2* | 6/2017 | Boehm | G06F 8/41 |
| 9,715,373 | B2* | 7/2017 | Boehm | G06F 8/41 |
| 9,972,063 | B2* | 5/2018 | Ashari | G06T 1/20 |

OTHER PUBLICATIONS

Learning Global and Reconfigurable Part-Based Models for Object Detection Xi Song; Tianfu Wu; Yi Xie; Yunde Jia 2012 IEEE International Conference on Multimedia and Expo Year: 2012 pp. 13-18 IEEE Conferences.*

A Multi-class Incremental and Decremental SVM Approach Using Adaptive Directed Acyclic Graphs Honorius Galmeanu; Razvan Andonie 2009 International Conference on Adaptive and Intelligent Systems Year: 2009 pp. 114-119 IEEE Conferences.*

Fault Diagnosis of Bearing Based on Empirical Mode Decomposition and Decision Directed Acyclic Graph Support Vector Machine Qiumian Hao; Wang Ziying 2009 International Conference on Computational Intelligence and Natural Computing Year: 2009, vol. 2 pp. 471-474 IEEE Conferences.*

ACM (DL) Digital Library Efficient coverage testing using global dominator graphs Hira Agrawal Telcordia Technologies, PASTE '99 Proceedings of the 1999 ACM SIGPLAN-SIGSOFT workshop on Program analysis for software tools and engineering pp. 11-20 Sep. 6-6, 1999 ACM.*

IEEE Transactions on Computer-Aided Design of Integrated Circuits and Systems, vol. 23, No. 2, Feb. 2004 Using Global Code Motions to Improve the Quality of Results for High-Level Synthesis Sumit Gupta, Nick Savoiu, Nikil Dutt, Rajesh Gupta, and Alex Nicolau pp. 302-312.*

ACM (DL) Digital Library Pregelix: Big(ger) graph analytics on a dataflow engine Journal Proceedings of the VLDB Endowment VLDB Endowment Hompage archive vol. 8 Issue 2, Oct. 2014 pp. 161-172 Yingyi Bu, Vinayak Borkar, Jianfeng Jia, Michael J. Carey, Tyson Condie ACM.*

ACM (DL) Digital Library Survey of graph database models Renzo Angles, Claudio Gutierrez Journal ACM Computing Surveys (CSUR) Surveys Homepage archive vol. 40 Issue 1, Feb. 2008 Article No. 1, pp. 1-39.*

Fukumoto, Y. et al., "Optimization for Multiple Machine Learning on MapReduce", IEICE Transactions on Information and Systems (Japanese Edition), May 1, 2013, pp. 1118-1131, vol. J96-D, Issue 5, The Institute of Electronics, Information and Communication Engineers (IEICE), Japan [English-language Abstract only].

Mell, P., et al., "The NIST Definition of Cloud Computing", National Institute of Standards and Technology Special Publication 800-145, Sep. 2011, pp. 1-7, U.S. Department of Commerce, United States.

* cited by examiner

580

---

Algorithm 1 GETOPTIMALPLAN

---

Require: Runtime Program *prog*,
1:   $C_{max} \leftarrow C(prog)$            // max cost bound
2:   $G \leftarrow$ BUILDGDFGRAPH(*prog*)      // global graph
3:   *memo* $\leftarrow \emptyset$, *pmemo* $\leftarrow \emptyset$       // memo structures
4:   for all $rv_i \in G$ do       // for each graph root
5:      $P \leftarrow$ OPTIMIZE($rc_i$, *memo*, $C_{max}$)    //Algorithm 2
6:      $p \leftarrow \underset{p \in P}{\arg\min}\, C(p)$          // optimal root plan
7:   SETPLANCONFIG($p, pmemo$)    // apply optimal config
8:   return RECOMPILEPROGRAM(*prog*)

Algorithm 2 OPTIMIZE (recursive)

---

Require: node $v$, memo table memo, cost bound $C_{max}$
 1: If ∃ $memo[v]$ then                                      // memoization
 2:    return $memo[v]$
 3:  $P \leftarrow$ ENUMNODEPLANS($v$, memo, $C_{max}$) // plans of $v$
 4: for all $c_i \in c(v)$ do                 // for each child node $c_i$
 5:    $P_c \leftarrow$ OPTIMIZE($c_i$, $C_{max}$)      // recursive optimize
 6:    if $type(c) =$ loop then
 7:       $P_c \leftarrow \sigma_{output=v}(P_c)$            // pick loop output
 8:    $P \leftarrow P \times P_c$                // enum possible plans
 9:  $P \leftarrow$ PRUNEINVALIDPLANS($P$)
10: $memo[v] \leftarrow$ PRUNESUBOPTIMALPLANS($P$, $C_{max}$)
11: return $memo[v]$

GLOBAL DATA FLOW OPTIMIZATION FOR MACHINE LEARNING PROGRAMS

BACKGROUND

Embodiments of the invention relate to data flow optimization, in particular, for global data flow optimization for machine learning programs.

Compilers for large-scale machine learning rely on a local optimization scope of individual basic blocks. This ensures simple and efficient compilation. Many real-world machine learning programs, however, exhibit deep control flow structures. In this context, local optimization misses major optimization potential due to missing information and limited optimization freedom.

SUMMARY

Embodiments of the invention relate to global data flow optimization for machine learning (ML) programs. In one embodiment, a method includes receiving, by a storage device, an initial plan for an ML program. A processor builds a nested global data flow graph representation using the initial plan. Operator directed acyclic graphs (DAGs) are connected using crossblock operators according to inter-block data dependencies. The initial plan for the ML program is re-written resulting in an optimized plan for the ML program with respect to its global data flow properties. The re-writing includes re-writes of: configuration dataflow properties, operator selection and structural changes.

These and other features, aspects and advantages of the present invention will become understood with reference to the following description, appended claims and accompanying figures.

BRIEF DESCRIPTION OF THE DRAWINGS

FIG. 6 illustrates pseudo code for a first algorithm/process, according to one embodiment;

FIG. 7 illustrates pseudo code for a second algorithm/process, according to one embodiment;

DETAILED DESCRIPTION

Figure 1:
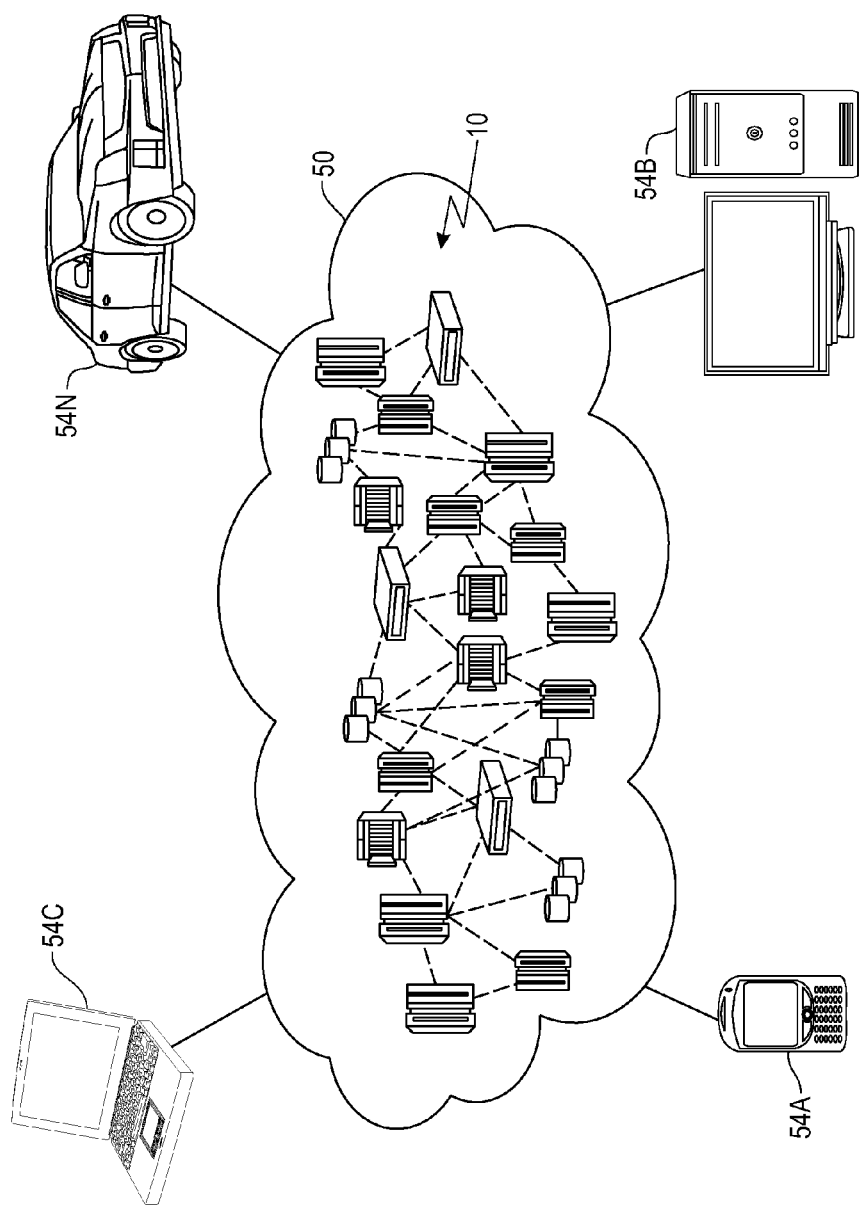
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
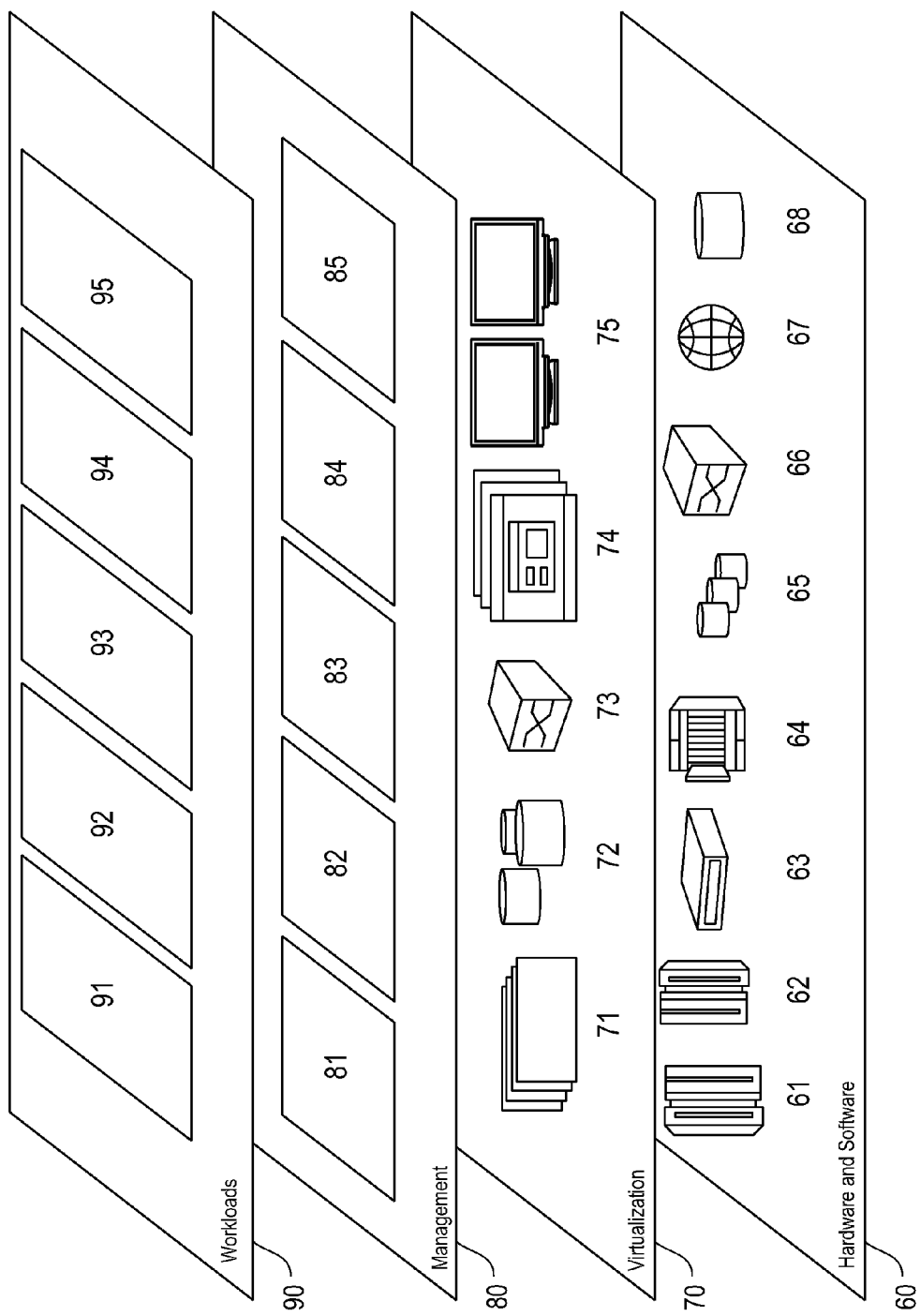
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Embodiments of the invention relate to global data flow optimization for machine learning (ML) programs. One embodiment provided is a method that includes receiving, by a storage device, an initial plan for an ML program. A processor builds a nested global data flow graph representation using the initial plan. Operator directed acyclic graphs (DAGs) are connected using crossblock operators and composite loop nodes according to inter-block data dependencies. The initial plan for the ML program is re-written resulting in an optimized plan for the ML program. The re-writing includes re-writes of: configuration properties, operator selection and structural changes.

One or more embodiments provide re-writing an arbitrary complex ML program to a global data flow graph—that covers the entire program—and optimization of data flow properties with exact and efficient enumeration processing. In one or more embodiments, an optimization framework is provided for global data flow optimization (including a nested plan representation, heterogeneous plan re-writes, a system "cost" model and runtime plan cost estimation (where system "cost" is defined in terms of estimated execution time of an execution plan of the ML program). In one embodiment, efficient and exact enumeration processing (e.g., as one embodiment of the search strategy) generates the globally optimal execution plan with regard to the defined re-writes of data flow properties. The enumeration processing applies to DAGs of operators and nested control flow structures. By making the simplifying assumption of no operator reordering, in one embodiment the enumeration processing is efficient in terms of polynomial processing time and linear space complexity. In one or more embodiments, the optimization framework and exact optimization processing are also applicable for scripting languages with: control and data flow, and high-impact re-writes of data flow properties, which are often the case in distributed runtime environments.

Figure 3:
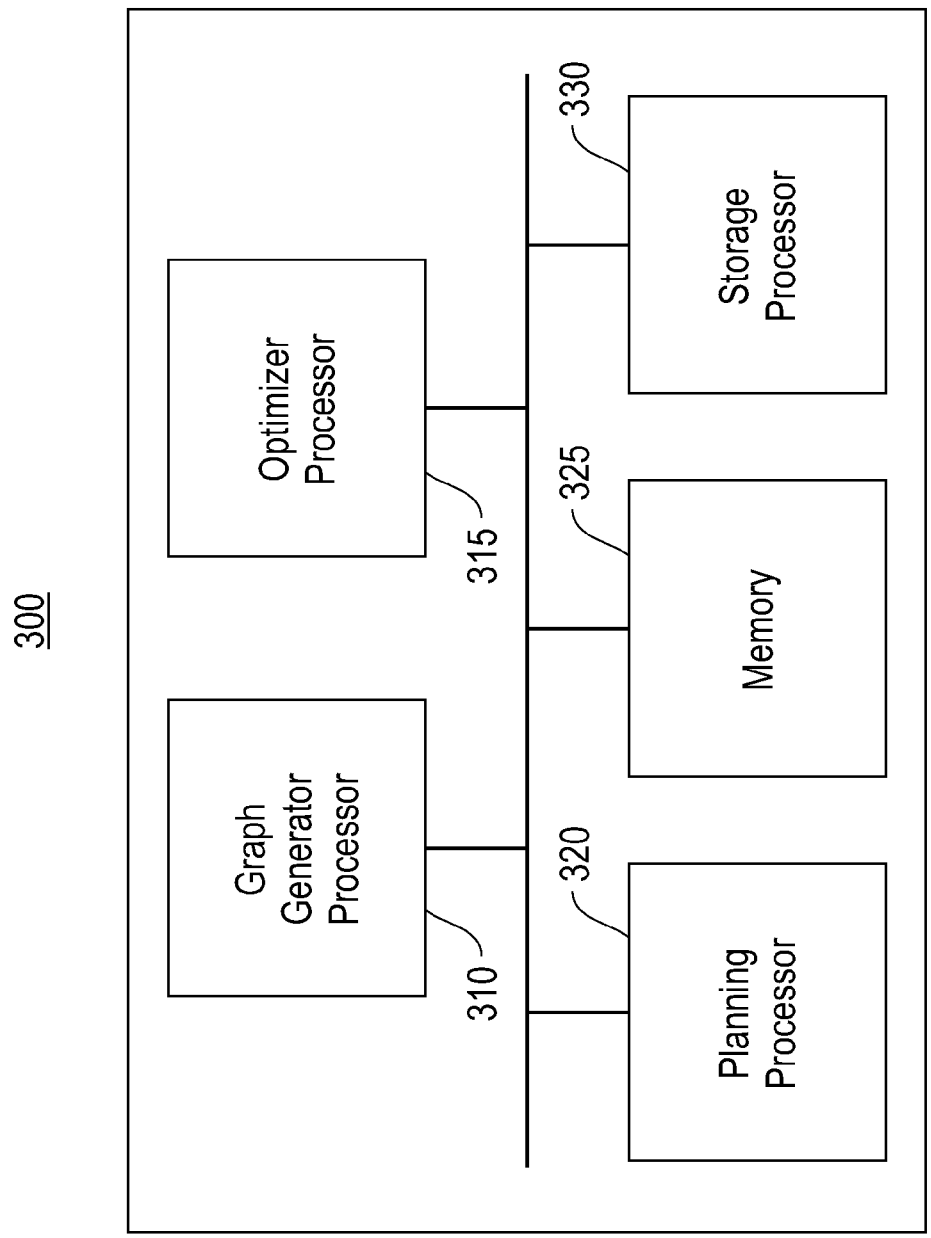
FIG. 3 is a block diagram illustrating a processing system for global data flow optimization (GDFO) for large scale machine learning (ML) programs, according to an embodiment.

FIG. 3 is a block diagram illustrating a processing system 300 (e.g., a computing system hardware processor device, a multiprocessor, compilation system processor, etc.) for global data flow optimization (GDFO) for large scale machine learning (ML) programs. In one embodiment, the processing system 300 includes a graph generator (or builder) processor 310, an optimizer processor 315, a planning processor 320, a memory device(s) 325 and a storage processor 330. In one embodiment, the processing system 300 is connected with one or more memory devices 325 (e.g., storage disk devices).

In one embodiment, the graph generator processor 310 performs generation of different graphs or trees for representing an ML program. In one example, the graphs or trees generated by the graph generator processor 310 may represent a transformation from a complex ML program to a global data flow graph. In one embodiment, the transformed graphs may include representation of compilation from declarative ML (DML) to high-level operator components (HOPs) directed acyclic graphs (DAGs), compilation from HOPS to low-level operator components (LOPs), compilation from LOPS to large ML jobs, etc.

In one embodiment, the optimizer processor 315 performs re-writes of the initial plan (e.g., transforming a local scope optimized ML program to a global scope optimized program for the ML program) resulting in a globally optimized plan for the ML program. In one embodiment, the re-writes include re-writes of: configuration properties, operator selection and structural changes. In one example embodiment, the optimizer processor 315 selects execution type of one or more operators for either in-memory execution of individual operations or distributed ML program execution of individual operations. In one embodiment the optimizer processor 315 perform automatic data partitioning of one or more matrices into direct accessible rows and columns or blocks, which prevents unnecessary ML (e.g., MapReduce (MR)/Sparks or distributed operations) program jobs and repeated scans of program data. The optimizer processor 315 changes a replication factor of an ML program job based on the execution type selection. In one embodiment, the optimizer processor 315 vectorizes loops to replace cell-wise, column-wise or row-wise operations with coarse-grained operations to reduce overhead from instruction execution, data copying, buffer pool maintenance and reduction of a number of ML program jobs. In one embodiment, the optimizer processor 315 changes data block size of one or more operations to influence memory consumption of block-wise instructions and a maximum degree of parallelism, and changes data format of intermediate results to prevent unnecessary format conversions. In one example, the optimizer processor 315 provides the selection of physical operators with block size constraints (e.g., constraint on the number of columns less than the block size). By increasing the block size, one or more embodiments can select more efficient physical operators. The selection is important if these operations are in loops and hence, executed many times. At the same time, one or more embodiments take memory and parallelism into account in order to prevent block size increases to an extent where it is counter-productive.

In one embodiment, the planning processor 320 determines the optimized plan by performing: a transformation based search to determine the optimized plan having a lowest run-time memory usage and processing latency (system "cost" analysis); an enumeration based search of trees to determine the optimized plan using interesting properties (IP) from each re-write and select a set of plans having lowest estimated execution time; an enumeration based search of DAGs to determine the optimized plan; and an enumeration based search of DAGs with control flow to determine the optimized plan. In one embodiment, the planning processor 320 determine re-writes of the initial plan for data flow and control flow of the ML program, and bounds the initial plan for the ML program based on run-time memory usage and processing latency.

In one embodiment, the initial storage of the initial plan, intermediate results and final results are stored in the memory 325, for which memory operations (e.g., reads, writes, etc.) are controlled by the storage processor 330. One or more embodiments employ the processing system 300 for GDFO processing for large scale ML programs, which is further described below.

Figure 4:
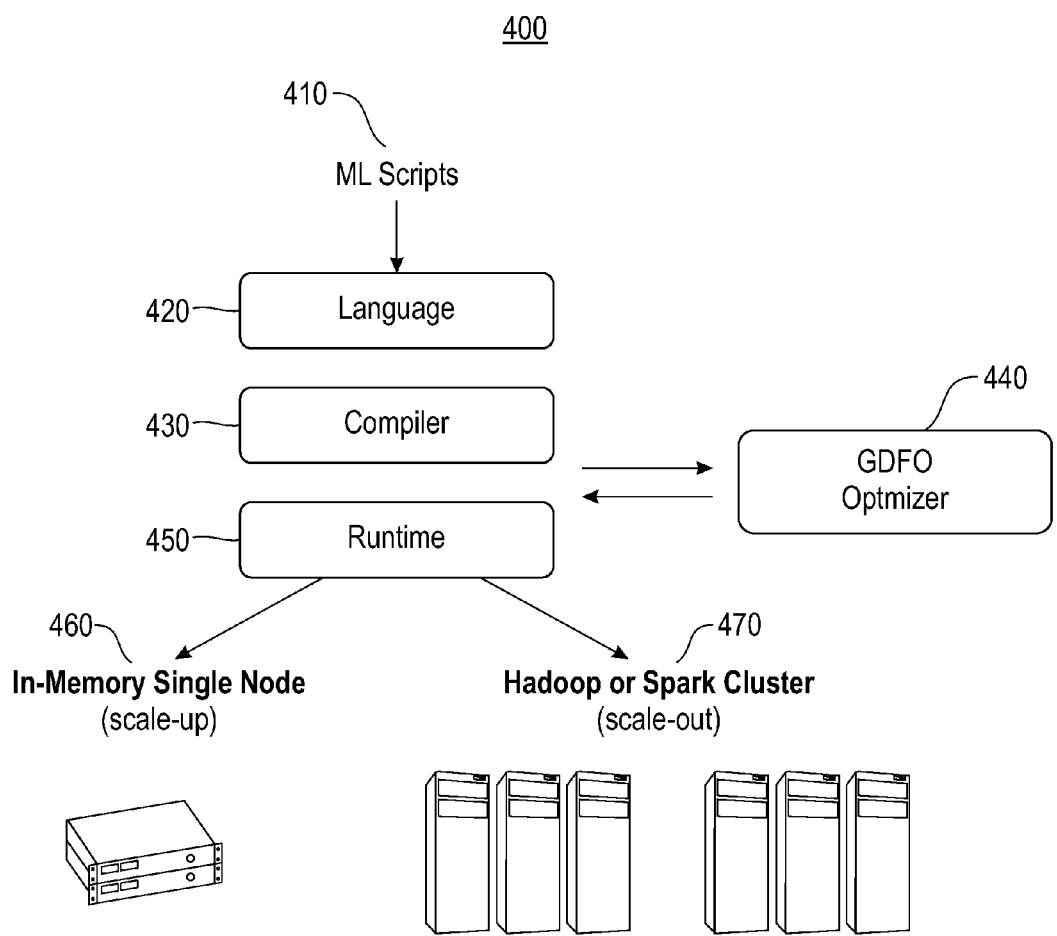
FIG. 4 illustrates a flow diagram for GDFO for large scale ML programs, according to one embodiment.

FIG. 4 illustrates a flow diagram 400 for GDFO for large scale ML programs, according to one embodiment. In one example, ML scripts 410 are received from a computing system (e.g., from a cloud computing system, an enterprise system, a distributed system, etc.). In one embodiment, the ML scripts 410 are transformed into a computing language 420 that is understandable by the processing system (e.g., processing system 300, FIG. 3). In another embodiment, the language 420 is recognized by the processing system for properly setting or selecting the correct compiler 430. In one embodiment, the ML program is obtained for a GDFO optimizer 440 (e.g., processing system 300 including the graph generator processor 310, the optimizer processor 315 and the planning processor 320 (FIG. 3)). In one embodiment, the global data flow optimized program is received for execution during runtime 450 and deployed to a scaled up (or large memory and many cores) in-memory single node 460 (e.g., JAVA®), or to a scaled-out (e.g., multiple node and distributed computation) system 470 (e.g., Hadoop cluster, SPARK® cluster, etc.). One or more embodiments support hybrid execution where a single ML program is partially executed in both backends (i.e., single node and multiple node); this may be the common case where operations are executed over large matrices as distributed operations, while all operations over small intermediates are executed in the single node backend.

Figure 5:
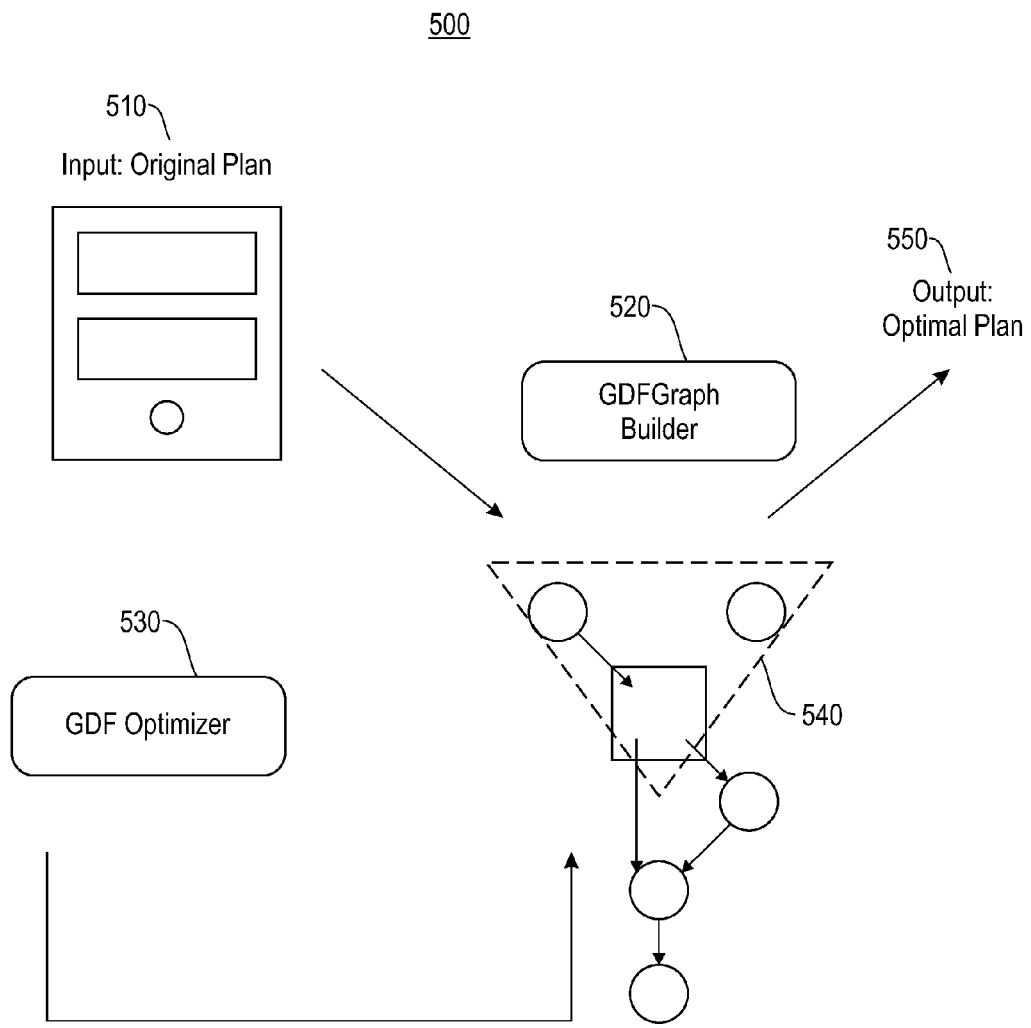
FIG. 5 illustrates another flow diagram for GDFO for large scale ML programs, according to one embodiment.

FIG. 5 illustrates another flow diagram 500 for GDFO for large scale ML programs, according to one embodiment. In one embodiment, the system processing optimizes data flow properties of an entire ML program in a holistic manner via GDFO. The foundation for GDFO is an optimization framework that includes a plan representation that covers the entire program, a variety of high-impact re-writes that affect data flow properties, a "cost" model including time and memory estimates to evaluate generated runtime plans, and solving the optimization problem with different search strategies. In one embodiment, the original plan 510 is received into the memory of the processing system (e.g., processing system 300). In one embodiment, the processing system performs graph generation (or building) by the GDF graph builder 520 (e.g., the graph generator processor 310, FIG. 3). The GDF graph builder 520 generates or builds a GDF graph representation 540 as a data structure in the memory (e.g., memory 325, FIG. 3).

In one embodiment, the GDF graph representation 540 is processed by the GDFO optimizer 530 (e.g., the optimizer processor 315, FIG. 3) with an initial execution plan (compiled with local optimization scope and given memory constraints) for which estimated execution time may be used for pruning enumerated plan alternatives because it provides a maximum "cost" bound (note that if any enumerated sub-plan has larger estimated execution time than this "cost" bound, it can never lead to the optimal plan). In one embodiment, the GDF optimizer 530 finds an optimal GDF configuration from the generated GDF graph representation 540 based on: enumerating plans (e.g., recursively via the planning processor 320, FIG. 3), generating GDF graph node plans, combines optimized children nodes of the GDF graph representation, prunes (e.g., removes, deletes, etc.) invalid plans (e.g., based on "cost" or bounded threshold(s)); plan validity constraints), prunes sub-optimal plans (including conflict resolution heuristics; "cost" model runtime plans), and memorizes or stores optimal plans per node/output iterations per second (ips) (e.g., a memo table with plan sets per node/ips). In one embodiment, an optimized plan 550 is output by extracting the optimized plan 550 (from the stored optimized plans) and configuring the optimal data flow properties.

In one embodiment, the plan representation is processed as follows. The plan representation needs to cover arbitrary complex ML programs, which consist of a hierarchy of statement blocks (e.g., if, for, generic, etc.) and statements, where predicates and last level blocks are compiled to individual DAGs of high-level operators. In one embodiment, a nested global data flow graph is generated. Based on the existing live variable analysis, in one embodiment operator DAGs are connected via 'crossblock' operators according to inter-block data dependencies. Alternative branches of if-statements are connected via 'split' and 'merge' operators. For loops (e.g., for and while loops), a nested 'loop' operator is used that recursively contains the operator DAGs of its body program. Using nested operators for loops is important in order to maintain the acyclic nature of the DAG.

In one embodiment, for re-writes a systematic approach of GDFO that allows integration of a variety of control flow and data flow rewrites that affect data flow properties is employed. Re-writes can be classified into three general categories: configuration properties, operator selection, and structural changes of the ML program. In one example, a simplifying assumption of no DAG changes is made, such that structural program changes are limited to generating alternative runtime programs for a given sub-DAG. A spectrum of high-impact re-writes performed by the optimizer covering all three categories as well as data and control flow are performed and described as follows.

Data Block Size (Configuration)

In one embodiment, changing the block size of an operation output (in internal binary block representation) allows to fit entire rows/columns into a single block, to influence the memory consumption of block-wise instructions, and to influence the maximum degree of parallelism. GDFO is necessary because all operations with data dependencies to this intermediate (potentially in different parts of the overall ML program) are affected. The block size affects operator selection decisions because various physical operators have constraints, such as the number of columns is smaller or equal to the block size—the ability to increase the block size and apply more efficient physical operators is very useful because often the effort for changing the block size is amortized by repeated execution of subsequent operations.

Data Format (Configuration)

In one embodiment, changing the format of intermediate results prevents unnecessary format conversions. This is also a system "cost" based decision because several operations can work on different formats but with different associated system "costs," while some operations require specific input/output formats. In one embodiment, the GDFO processing determines the intermediate format and the correct choice of format conversions based on analyzing the entire program in order to take all system consumers and chains of operators into account.

Execution Type (Operator Selection)

In one embodiment, selecting the execution type of an operator allows for determining between in-memory or distributed ML execution for individual operations. Besides the actual operation "costs" (single-threaded in memory vs. distributed out-of-core) this takes the data exchange between in-memory and Hadoop distributed file system (HDFS), and piggypacking (packing multiple operations into a single ML or MapReduce (MR) job, potentially with scan sharing) into account. Especially, in the context where intermediates are consumed by multiple operations (potentially in different parts of the program), this requires GDFO.

Automatic Data Partitioning (Operator Selection)

In one embodiment, automatic access-aware partitioning is used to partition large matrices into directly accessible rows, columns, or blocks and has the potential of preventing many unnecessary ML jobs and repeated scans of the data. It is a "cost" based decision because the processing evaluates if the system "costs" for partitioning (including the selected replication) are amortized by more efficient indexed access. GDFO is required because it is necessary to take all potential system consumers into account and to decide where and how to partition.

Physical Partitioning of Distributed Matrices

In one embodiment, in contrast to column-/row-wise data partitioning, physical partitioning specifically applies to a Spark backend, where join or reducebykey operations exploit existing partitioning information. In one example, if for X %*% y, X is already hash partitioned, it is only necessary to hash-partition y and to zip partitions together, which prevents the shuffle of X. In one embodiment, this is exploited by explicitly introducing reparation operations in front of loops to shuffle X once and repeatedly leverage its existing partitioning.

Automatic Vectorization (Structural Change)

In one embodiment, automatically vectorizing loops aims atreplacing cell-, column-, or row-wise operations with more coarse-grained operations in order to reduce overhead from instruction execution, data copying, buffer pool maintenance andpotentially smaller number of ML jobs. This is a system "cost" based decision because higher memory consumption of individual operations might lead to different operator selections and preventing certain other high-impact re-writes. GDFO is required in order to determine the largest scope of potential vectorizations.

Replication Factor (Configuration)

In one embodiment, based on the selected execution type, the replication factor of an ML job can be changed, which affects the replication of all its outputs. A higher replication factor increases the write overhead, but at the same time increases data locality of following operators and is beneficial if an intermediate result is used many times. Hence, GDFO is required in order to reason about all consuming operators and piggypacking influences.

Checkpointing (Configuration)

In one embodiment, checkpointing includes decisions on distributed caching, along with a particular storage level.

Empty Block Materialization (Configuration)

In one embodiment, by default a distributed matrix materializes empty blocks in order to enable operations, such as X+7, in data parallel distributed computing where input blocks trigger computation. In one example, for sparse-safe operations such as matrix multiplication, this is not required; in order to determine that, however, it is necessary to determine all the consumers of this intermediate.

System "Cost" Model

In one embodiment, as a fundamental prerequisite for system "cost" based optimization, a system "cost" model and accurate estimates are used. In one example, a "cost" model based on estimated execution time of an execution plan of the ML program. Since, the system processing needs to ensure hard memory constraints, in one embodiment worst-case memory estimates are used. GDFO requires several important extensions:

1) The inter-influences between operators are evaluated in terms of potentially many system consumers of intermediate results and piggypacking across sub-DAGs of operators. Hence, a system "cost" model is used to evaluate generated runtime plans because this allows the processing system to take all compilation aspects into account.
2) Data flow properties are evaluated, which requires to precisely modelboth computation and input/output (I/O) "costs" (both in awareness of piggypacking to account for parallelism and scan sharing). This prevents pure black-box performance profiling of individual operators. Hence, a white-box "cost" model is used that explicitly takes read/write "costs" (including data exchange between in-memory and ML operations), compute "costs," the degree of parallelism, ML job latency, etc. into account. For compute "costs," either a static model based on the number of floating point operations or a dynamic model based on offline performance profiling is employed.
3) Worst-case estimates are propagated along global data flow graphs because, due to alternative branches or unknown loop bounds, exact intermediate result sizes mightbe unknown.

Combining these, a white-box "cost" model is deployed on the basis of generated runtime plans as well as time and memory estimates based on worst-case estimates of matrix characteristics. This time-based model allows linearization of JO, latency, and computation execution time into the single "cost" measure. The model also provides an analytical "cost" model for entire ML programs because it does not rely on profiling runs, and the runtime plans covers the entire control flow as well. In one example, the model is aware of available resources because the compiler already respects all memory constraints when generating runtime plans, and the degree of parallelism is explicitly taken into account.

Optimization Problem

Given an ML program "prog," a cost model C, a set of re-writes R (with validity constraints Z), the optimization problem is to find a valid (semantically equivalent) execution plan P with P=argmin C(f(prog, R)) s.t. memory constraints per execution context. Finally, this optimization problem can be addressed with various search strategies, but the goal is to find an exact optimal solution with regard to the given rewrites.

Exact Enumeration Algorithm Processing

In order to achieve exact global data flow optimization, i.e., solve the defined optimization problem with optimality guarantee according to the defined re-writes, in one embodiment an exact enumeration algorithm process is performed by the processing system. In one example, the GDFO processing is a top-down dynamic programming enumeration process with regard to interesting data flow properties.

Interesting Properties

In one embodiment, as a precondition, interesting properties of intermediate results (data flow properties) need to be defined, and it must be determined how the GDFO processing can influence them. In general, applying re-writes to an operation determines the interesting data flow properties of this operation's output and hence, affects all operations that consume this intermediate result. The interesting properties influenced by the defined set of re-writes R is as follows.

Data Block Size

Changing the block size of an intermediate on HDFS is relevant if the execution type of this operation or its consumers is ML. In one embodiment, due to a potentially large domain of the block size, a simplifying assumption is made that small changes do not significantly affect resulting costs and bin the block size (e.g., 500, 1000, 1500, 2000, etc.). This significantly reduces the number of interesting property instances. In one or more embodiments, the discretization may be performed with equi-width block size (e.g., 500, 1500, 2000, 2500, etc.) or may be exponentially increasing widths (1000, 2000, 4000, 8000, etc.), where the latter leads to a logarithmic number of instances.

Data Format

Changing the format leads to a particular format of this intermediate result. Again, this only affects the runtime plan, if the intermediate is materialized on HDFS (between ML jobs or between in-memory operations and ML jobs). In one embodiment setting, five alternative formats may include: textcell, textmatrixmarket, textcsv, binarycell, and binaryblock, hence, a small domain.

Data Location

Deciding on the execution type of an operation affects its data location: in-memory or HDFS. Furthermore, there are side effects to other interesting properties: only if the data location is HDFS, blocksize and format become relevant. In one embodiment, determining the execution type of an operation and on checkpointing (including the associated storage level) affects its data location: single-node in-memory, distributed memory (e.g., see Spark storage levels or HDFS). Furthermore, there are side effects to other interesting properties: only if the data location is HDFS or distributed cache, the block size, format and empty block materialization matter.

Data Partitioning Scheme

Automatic partitioning decides on none, row-, column-, or block-wise partitioning schemes. This clearly affects all system consumers of this particular intermediate.

Replication Factor

The replication factor itself is an interesting data flow propertyof intermediate results because it again affects all subsequent operators.

Note that vectorization itself does not create additional interesting properties, but is affected by input properties because, for example, partitioned inputs prevent vectorization. Finally, an intermediate result is always described by concrete instances of all these interesting properties according to the generated runtime plan that produces this intermediate.

Enumeration Algorithm DP-GDF

All necessary preconditions have been discussed, and the processing system can define the actual enumeration algorithm processing DP-GDF. In one embodiment, a top-down dynamic programming enumeration processing algorithm is used with regard to interesting data flow properties. This processing recursively optimizes individual operators starting from the final results by generating optimal subplans for each combination of interesting properties of operator outputs. At each operator, optimal plans of operator inputs are combined and pruned according to the interesting properties. In the following, the general behavior of this processing is discussed and subsequently discussed are specific aspects.

FIG. 6 illustrates pseudo code for a first algorithm/process 580, according to one embodiment. FIG. 7 illustrates pseudo code for a second algorithm/process 590, according to one embodiment. In one embodiment, the DP-GDF optimizing process is invoked for each root node of the global data flow graph and for each, the optimal execution plan is generated, where a memo structure is used to reuse results from overlapping subplans (and because sub-DAGs may be visited multiple times). Hence, at each operator, first it is probed whether an optimal plan for this particular operator is already provided. If a plan is not yet generated, local operator plans are enumerated for this operator. This applies the individual re-writes if applicable and realizes additional validity checks. Subsequently, the set of child nodes is iterated over, and the DP-GDF optimizing process is recursively executed on those nodes, and the cross product of plan combinations are generated. Many of those combinations are invalid or undefined, and hence, can be pruned. In one embodiment, variant processing of early pruning is used in order to directly prune suboptimal plans as well, which is applicable for certain operators (e.g., external function calls). However, there is a final call to prune all suboptimal plans.

After pruning there exists exactly one optimal plan per combination of instances of interesting properties because only those properties affect subsequent operators. The result is then stored in the memo table and processing returns back to the parent operator. Since loops are nested operators, its predicate and body DAGs are recursively enumerated in enumOperatorPlans because this creates all operator-local plans.

In one embodiment, the DP-GDF optimizing process produces the exact optimal plan for tree-shaped global data flow graphs. However, DAGs and nested loop control structures require additional treatment. First, it is important to note that in case of DAGs, Bellman's principle of optimality, i.e., the optimal solution is composed of optimal solutions to its subproblems does not apply because the subproblems of child operator DAGs are not independent. Despite memorization, this poses a challenge because plans for different inputs might refer to different subplans (interesting properties) for shared operators, even though it is an uncommon case. In one embodiment, a containment check of child operators with multiple outputs is performed during setPlanConfig (FIG. 6) and implicitly on costing. If inconsistencies are detected, heuristics are used to resolve these inconsistencies. In one embodiment, if all inputs adhere to the same plan, the processing can simply stitch plans together, while otherwise, a new execution plan is generated. Second, for loops, the number of iterations may not be known. In one embodiment, the DP-GDF processing is based on the property of loop insensitivity. If the optimal plan of the loop body is loop-insensitive (it does not depend on the number of iterations) or if the number of iterations is known or a default number of iterations is assumed, this reflects that the loop is likely executed multiple times; otherwise the processing falls back to a heuristic, generates a reasonable plan, but cannot guarantee optimality.

The DP-GDF processing is efficient in terms of polynomial time and linear space complexity. In one example, let n be the number of operators and lambda be the number of combinations of interesting property instances. Essentially, for each operator, the cross product of local operator configurations with child plans is created, but the processing prunes them to at most lambda output plans per operator. Given that the maximum number of children is three (tertiary operators), the processing generates at most $O(n*lambda^4)$ plans and store at most $O(n*lambda)$ plans in the memo table. Containment and loop insensitivity checks may be performed in $O(n*lambda)$ and costing of subplans; however by partial costing (which also include the containment checks) and related memorization, it can be reduced to $O(n*lambda^4)$ time complexity, which is important for large ML programs where the number of operators n may be large (e.g., up to several 1000s for certain ML algorithms). Hence, overall a worst-case time complexity of $O(n^2*lambda+n*lambda^4)$ and a worst-case space complexity of $O(n*lambda)$ is observed.

Figure 8:
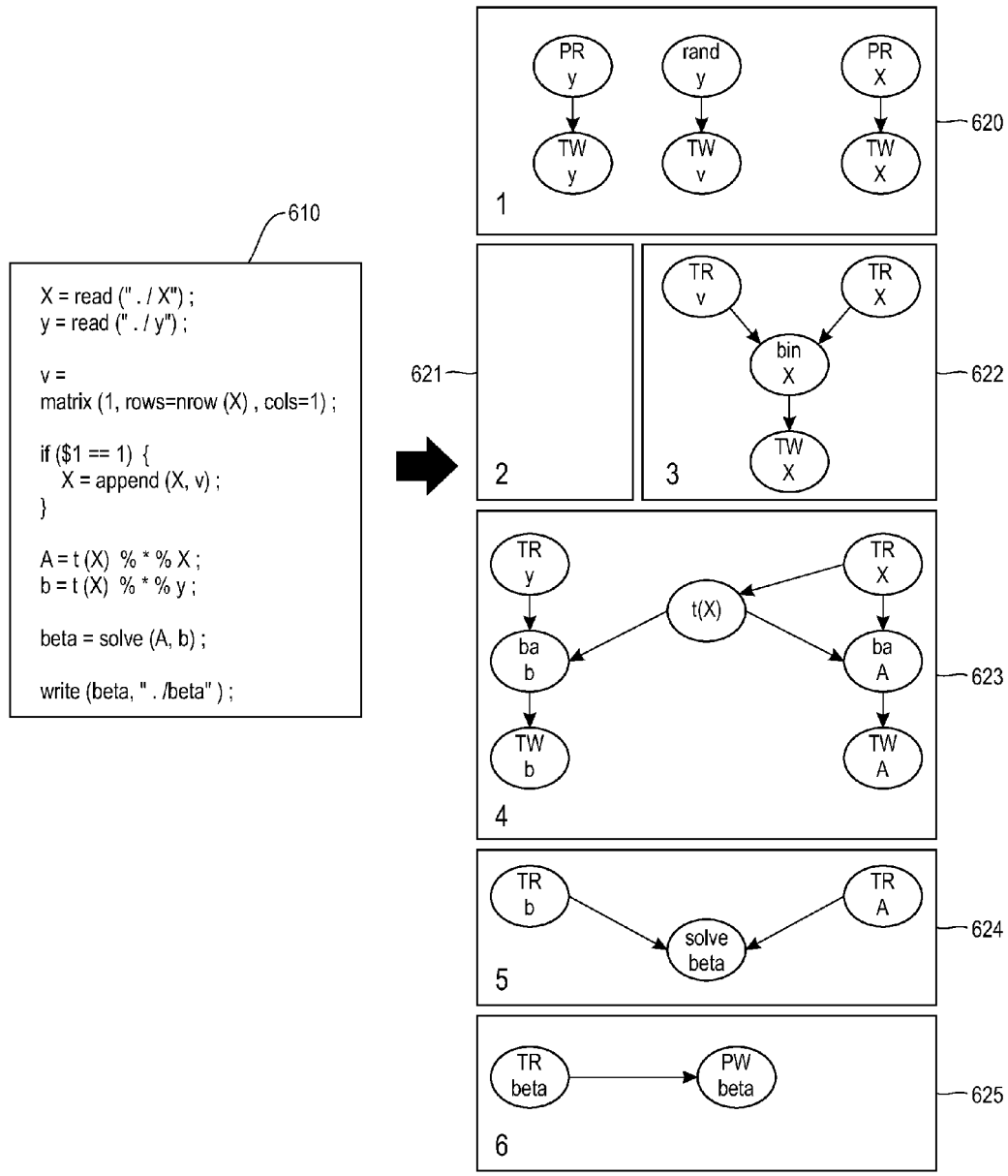
FIG. 8 illustrates an example representation of compilation from declarative ML (DML) to high-level operator components (HOPs) directed acyclic graphs (DAGs), according to one embodiment.

FIG. 8 illustrates an example representation 600 of compilation from declarative ML (DML) to high-level operator components (HOPs) DAGs, according to one embodiment. In one embodiment, the example script 610 for linear regression is transformed from DML, which has R like syntax, declarative elements and control flow elements, to hops level DAGs by re-writes. In one embodiment, the graphic representation is generated by the graph generator processor 310 (FIG. 3) and stored in the memory 325. The representation includes the transformation from graphs 620, 621, 622, 623 and results in the HOPS DAGs representation 624 and 625.

Figure 9:
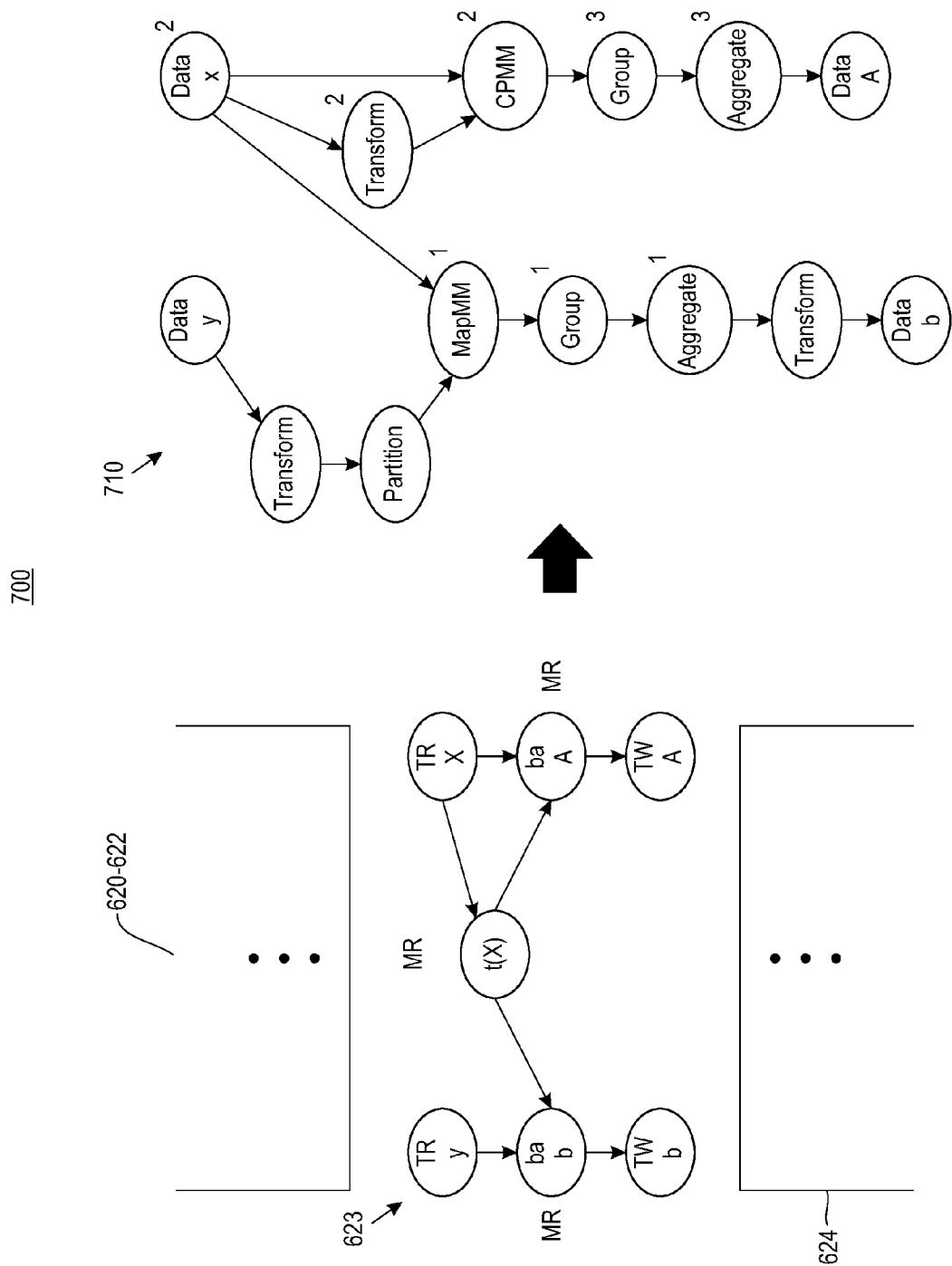
FIG. 9 illustrates an example representation of compilation from HOPS to low-level operator components (LOPs), according to one embodiment.

FIG. 9 illustrates an example representation 700 of compilation from HOPS to low-level operator components (LOPs), according to one embodiment. In one embodiment, the MR or ML representation 623 is transformed to the LOPs representation 710 as shown.

Figure 10:
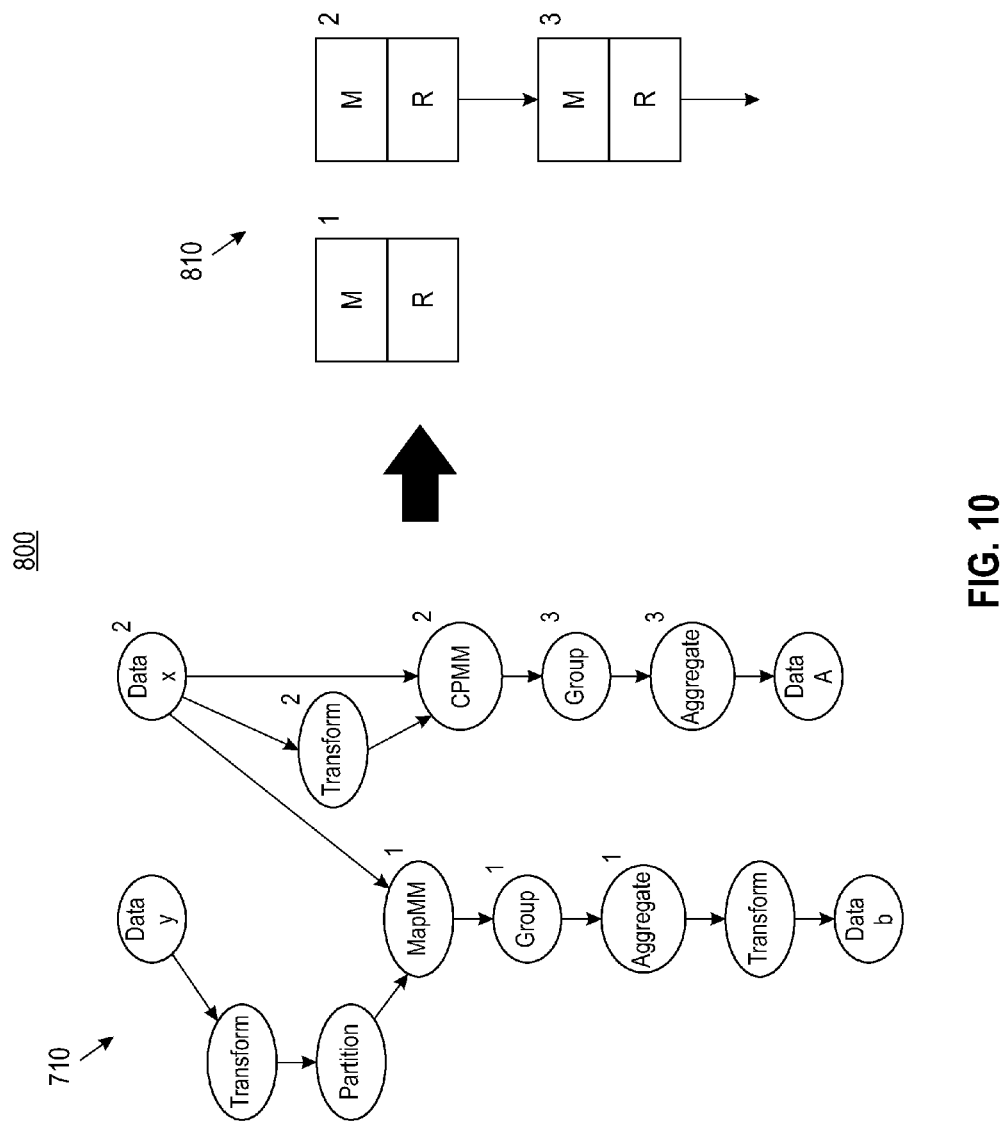
FIG. 10 illustrates an example representation of compilation from LOPS to large ML jobs, according to one embodiment.

FIG. 10 illustrates an example representation 800 of compilation from LOPS to large scale ML or MR jobs, according to one embodiment. As shown, the LOPs representation 710 is transformed to ML or MR jobs 810 (1, 2, 3).

Figure 11:
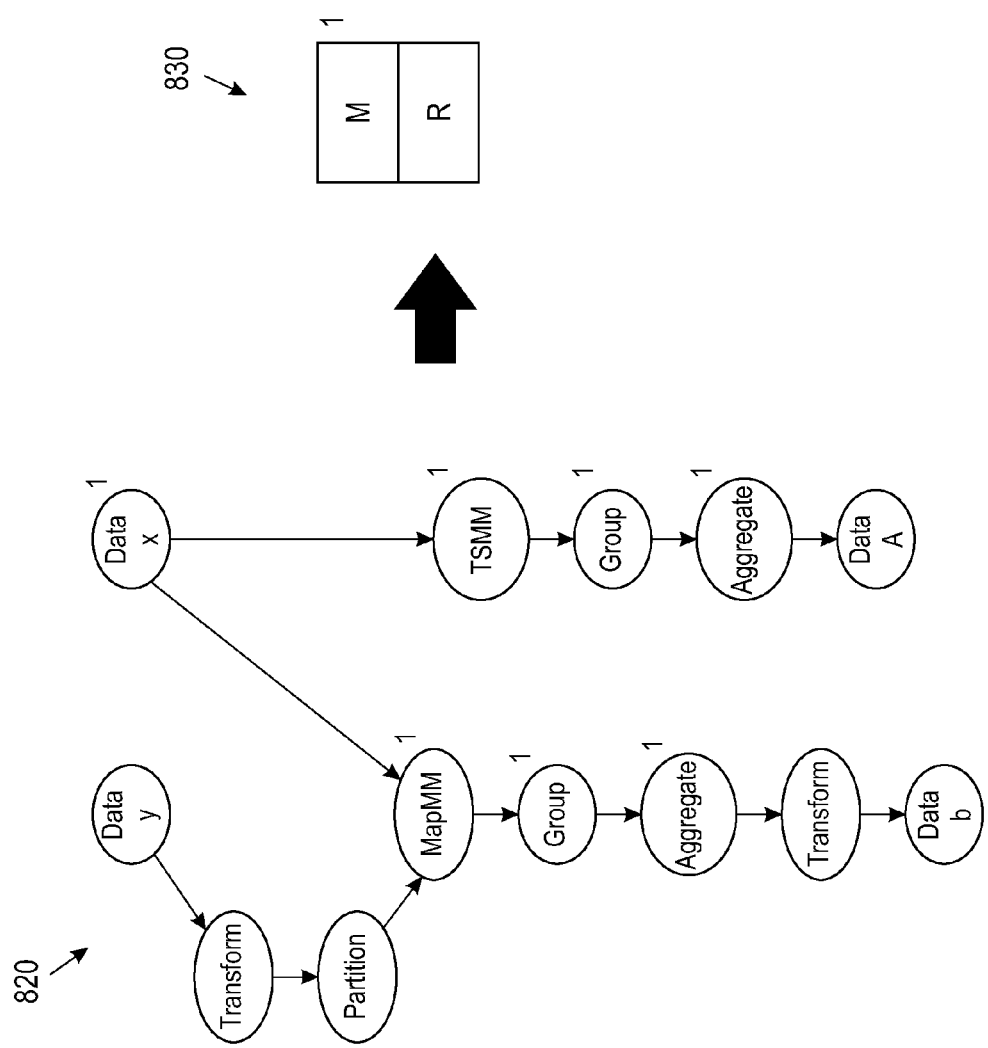
FIG. 11 illustrates an example representation of global data flow optimization that leads to performance improvements of the representation showed in FIG. 10, according to one embodiment.

FIG. 11 illustrates an example representation of global data flow optimization that leads to performance improvements, according to one embodiment. As an extension of the example 800 of FIG. 8, the LOPs representation 820 is transformed to an ML or MR job 830 (1).

Figure 12:
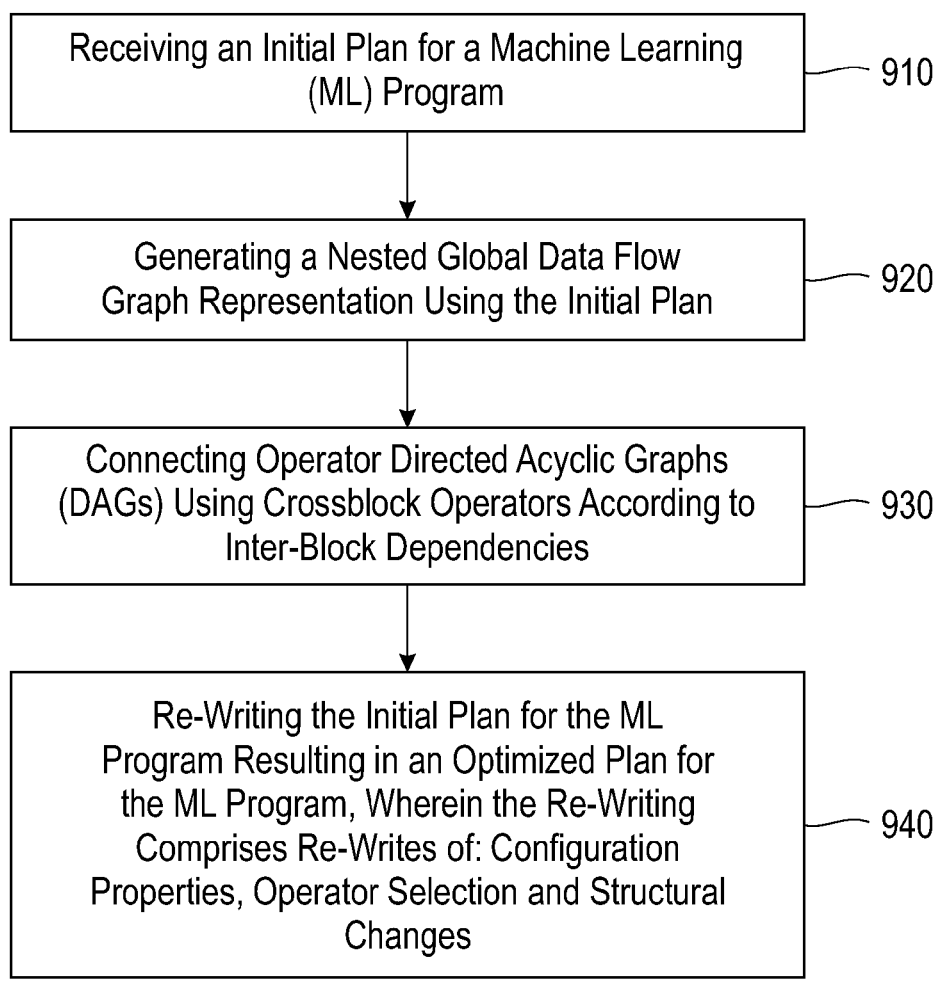
FIG. 12 illustrates a block diagram for a process for GDFO for large scale ML programs, according to one embodiment.

FIG. 12 illustrates a block diagram for a process 900 for GDFO for large scale ML programs, according to one embodiment. In one embodiment, in block 910 the process 900 receives, by a storage device (e.g., memory 325), an initial plan for an ML program. In one embodiment, in block 920 process 900 generates, by a processor (e.g., the graph generator processor 310), a nested global data flow graph representation using the initial plan. In one embodiment, in block 930 operator DAGs are connected using crossblock operators according to inter-block dependencies. In one embodiment, in block 940 the optimizer processor 315 (FIG. 3) re-writes the initial plan for the ML program resulting in an optimized plan for the ML program. The re-writing includes re-writes of: configuration properties, operator selection and structural changes.

In one embodiment, the process 900 may further include determining re-writes of the initial plan for data flow and control flow of the ML program. In one embodiment, process 900 may further include bounding the initial plan for the ML program based on run-time memory usage and processing latency. In one embodiment, the re-writing includes: changing data block size of one or more operations. The block size affects operator selection decisions because various physical operators have constraints, such as the number of columns is smaller or equal the block size—the ability to increase the block size and apply more efficient physical operators is very useful because often the effort for changing the block size is amortized by repeated execution of subsequent operations. By increasing the block size, one or more embodiments can select more efficient physical operators. The selection is important if these operations are in loops and hence, executed many times. At the same time, one or more embodiments take memory and parallelism into account in order to prevent block size increases to an extent where it is counter-productive.

In one embodiment, the re-writing may further include: selecting execution type of one or more operators for either in-memory execution of individual operations or distributed ML program execution of individual operations; performing automatic data partitioning of one or more matrices into direct accessible rows and columns or blocks, wherein the performing automatic data partitioning prevents unnecessary ML program jobs and repeated scans of program data; and changing a replication factor of an ML program job based on the execution type selection.

In one embodiment, the re-writing may further include: vectorizing loops for replacing cell-wise, column-wise or row-wise operations with coarse-grained operations for reducing overhead from one or more of: instruction execution, data copying, buffer pool maintenance and reducing a number of ML program jobs. In one embodiment, process 900 may further include determining the optimized plan based on one or more of: performing a transformation based search for determining the optimized plan having lowest run-time memory usage and processing latency; performing an enumeration based search of trees for determining the optimized plan using interesting properties (IP) from each re-write of the re-writing and selecting a set of plans having lowest run-time memory usage and processing latency; performing an enumeration based search of DAGs for determining the optimized plan; and performing an enumeration based search of DAGs with control flow for determining the optimized plan.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, by a storage device, an initial plan for a machine learning (ML) program;
   generating, by a processor, a nested global data flow graph representation as a data structure using the initial plan, wherein the nested global data flow graph represents a transformation from a complex ML program to a global data flow graph;
   connecting operator directed acyclic graphs (DAGs) using crossblock operators according to inter-block data dependencies; and
   re-writing the initial plan for the ML program resulting in an optimized plan for the ML program with respect to its global data flow properties, wherein the re-writing transforms the ML program from a local scope optimized ML program to a global scope optimized program, and the re-writing comprises re-writes of: configuration dataflow properties, operator selection and structural changes.

2. The method of claim 1, further comprising determining re-writes of the initial plan for data flow and control flow of the ML program.

3. The method of claim 2, further comprising:
   bounding the initial plan for the ML program based on estimated execution time of the optimized plan of the ML program.

4. The method of claim 3, wherein the re-writing includes:
   changing data block size of one or more operations for selecting efficient physical operators and taking memory and parallelism into account to prevent block size increases to an extent where memory increase is counter-productive; and changing data format of intermediate results for prevention of unnecessary format conversions.

5. The method of claim 4, wherein the re-writing includes:
selecting execution type of one or more operators for either in-memory execution of individual operations or distributed ML program execution of individual operations;
performing automatic data partitioning of one or more matrices into direct accessible rows and columns or blocks, wherein the performing automatic data partitioning prevents unnecessary ML program jobs and repeated scans of program data;
changing a replication factor of an ML program job based on the execution type selection;
performing checkpointing that includes determining distributed caching and a particular storage level; and
empty block materialization to enable operations for data parallel distributed computing.

6. The method of claim 5, wherein the re-writing includes:
vectorizing loops for replacing cell-wise, column-wise or row-wise operations with coarse-grained operations for reducing overhead from one or more of: instruction execution, data copying, buffer pool maintenance and reducing a number of ML program jobs.

7. The method of claim 6, further comprising:
determining the optimized plan based on one or more of:
performing a transformation based search for determining the optimized plan having lowest run-time memory usage and processing latency; and
performing an enumeration based search of trees for determining the optimized plan using interesting properties (IP) from each re-write of the re- writing and selecting a set of plans having lowest run-time memory usage and processing latency.

8. The method of claim 7, further comprising:
performing an enumeration based search of DAGs for determining the optimized plan; and
performing an enumeration based search of DAGs with control flow for determining the optimized plan.

9. A computer program product for global data flow optimization for machine learning (ML) programs, the computer program product comprising a computer readable storage medium having program instructions embodied therewith, the program instructions executable by a processor to cause the processor to:
receive, by a storage device, an initial plan for an ML program;
generate, by the processor, a nested global data flow graph representation as a data structure using the initial plan, wherein the nested global data flow graph represents a transformation from a complex ML program to a global data flow graph;
connect, by the processor, operator directed acyclic graphs (DAGs) using crossblock operators according to inter-block data dependencies; and
re-write, by the processor, the initial plan for the ML program resulting in an optimized plan for the ML program with respect to its global data flow properties, wherein the re-write transforms the ML program from a local scope optimized ML program to a global scope optimized program, and the re-write comprises re-writes of: configuration dataflow properties, operator selection and structural changes.

10. The computer program product of claim 9, further comprising program instructions executable by the processor to cause the processor to:
determine, by the processor, re-writes of the initial plan for data flow and control flow of the ML program.

11. The computer program product of claim 10, further comprising program instructions executable by the processor to cause the processor to:
bound, by the processor, the initial plan for the ML program based on estimated execution time of the optimized plan of the ML program.

12. The computer program product of claim 11, wherein the re-write further comprising program instructions executable by the processor to cause the processor to:
change, by the processor, data block size of one or more operations for selecting efficient physical operators and taking memory and parallelism into account to prevent block size increases to an extent where memory increase is counter-productive; and
change, by the processor, data format of intermediate results for prevention of unnecessary format conversions.

13. The computer program product of claim 12, wherein the re-write further comprising program instructions executable by the processor to cause the processor to:
select, by the processor, execution type of one or more operators for either in-memory execution of individual operations or distributed ML program execution of individual operations;
perform, by the processor, automatic data partitioning of one or more matrices into direct accessible rows and columns or blocks, wherein the performing automatic data partitioning prevents unnecessary ML program jobs and repeated scans of program data;
change, by the processor, a replication factor of an ML program job based on the execution type selection;
perform, by the processor, checkpointing that includes determining distributed caching and a particular storage level; and
provide, by the processor, empty block materialization to enable operations for data parallel distributed computing.

14. The computer program product of claim 13, wherein the re-write further comprising program instructions executable by the processor to cause the processor to:
vectorize, by the processor, loops for replacing cell-wise, column-wise or row-wise operations with coarse-grained operations for reducing overhead from one or more of: instruction execution, data copying, buffer pool maintenance and reducing a number of ML program jobs.

15. The computer program product of claim 14, further comprising program instructions executable by the processor to cause the processor to:
determine, by the processor, the optimized plan based on one or more of:
perform, by the processor, a transformation based search for determining the optimized plan having lowest run-time memory usage and processing latency;
perform, by the processor, an enumeration based search of trees for determining the optimized plan using interesting properties (IP) from each re-write of the re-writing and selecting a set of plans having lowest run-time memory usage and processing latency;
perform, by the processor, an enumeration based search of DAGs for determining the optimized plan; and
perform, by the processor, an enumeration based search of DAGs with control flow for determining the optimized plan.

16. An apparatus comprising:
a storage device configured to receive an initial plan for a machine learning (ML) program;
a graph generation processor configured to generate a nested global data flow graph representation as a data structure using the initial plan, and to connect operator directed acyclic graphs (DAGs) using crossblock operators according to inter-block data dependencies, wherein the nested global data flow graph represents a transformation from a complex ML program to a global data flow graph; and
an optimizer processor configured to re-write the initial plan for the ML program resulting in an optimized plan for the ML program with respect to its global data flow properties, wherein the re-write transforms the ML program from a local scope optimized ML program to a global scope optimized program, and the re-write comprises re-writes of: configuration dataflow properties, operator selection and structural changes.

17. The apparatus of claim 16, further comprising:
a planning processor configured to:
determine re-writes of the initial plan for data flow and control flow of the ML program;
bound the initial plan for the ML program based on estimated execution time of the optimized plan of the ML program; and
the optimizer processor is configured to:
change data block size of one or more operations to select efficient physical operators and take memory and parallelism into account to prevent block size increases to an extent where memory increase is counter-productive; and
change data format of intermediate results to prevent of unnecessary format conversions.

18. The apparatus of claim 17, wherein the optimizer processor is configured to:
select execution type of one or more operators for either in-memory execution of individual operations or distributed ML program execution of individual operations;
perform automatic data partitioning of one or more matrices into direct accessible rows and columns or blocks, wherein the performing automatic data partitioning prevents unnecessary ML program jobs and repeated scans of program data;
change a replication factor of an ML program job based on the execution type selection;
perform checkpointing that includes determining distributed caching and a particular storage level; and
provide empty block materialization to enable operations for data parallel distributed computing.

19. The apparatus of claim 18, wherein the optimizer processor is configured to vectorize loops to replace cell-wise, column-wise or row-wise operations with coarse-grained operations to reduce overhead from one or more of: instruction execution, data copying, buffer pool maintenance and reducing a number of ML program jobs.

20. The apparatus of claim 19, wherein the planning processor is configured to:
determine the optimized plan by being configured to perform one or more of:
a transformation based search to determine the optimized plan having lowest run-time memory usage and processing latency;
an enumeration based search of trees to determine the optimized plan using interesting properties (IP) from each re-write and select a set of plans having lowest run-time memory usage and processing latency;
an enumeration based search of DAGs to determine the optimized plan; and
an enumeration based search of DAGs with control flow to determine the optimized plan.

* * * * *